(12) United States Patent
Inkinen (10) Patent No.: US 12,477,603 B2
(45) Date of Patent: Nov. 18, 2025

(54) CONTROLLING COMMUNICATION OF A DETECTOR-DEFINED SPACE

(71) Applicant: FRAMERY OY, Tampere (FI)

(72) Inventor: Timo Inkinen, Tampere (FI)

(73) Assignee: FRAMERY OY, Tampere (FI)

( * ) Notice: Subject to any disclaimer, the term of this patent is extended or adjusted under 35 U.S.C. 154(b) by 0 days.

(21) Appl. No.: 18/715,911

(22) PCT Filed: Jan. 9, 2023

(86) PCT No.: PCT/FI2023/050018
§ 371 (c)(1),
(2) Date: Jun. 3, 2024

(87) PCT Pub. No.: WO2023/135363
PCT Pub. Date: Jul. 20, 2023

(65) Prior Publication Data
US 2025/0024536 A1    Jan. 16, 2025

(30) Foreign Application Priority Data

Jan. 14, 2022    (FI) ..................................... 20225031

(51) Int. Cl.
*H04W 12/50* (2021.01)
*H04W 48/04* (2009.01)
*H04W 76/14* (2018.01)

(52) U.S. Cl.
CPC ........... *H04W 76/14* (2018.02); *H04W 48/04* (2013.01)

(58) Field of Classification Search
CPC ....... H04W 76/14; H04W 48/04; H04W 4/33; H04W 4/80; H04W 12/50; H04W 4/021; H04W 4/30; H04W 12/069; H04W 12/082; H04W 64/00; H04W 76/00; H04W 84/10; H04W 84/18; H04W 12/041; H04W 12/0471; H04W 12/61; H04W 12/63; H04W 12/0431; H04W 4/70;
(Continued)

(56) References Cited

U.S. PATENT DOCUMENTS

| 11,092,682 B1 * | 8/2021 | Meingast | H04W 76/11 |
| 11,902,098 B1 * | 2/2024 | White | H04L 41/0894 |
| 2004/0167881 A1 * | 8/2004 | Masuda | H04L 67/52 |

(Continued)

FOREIGN PATENT DOCUMENTS

CN    112153642 A    12/2020

OTHER PUBLICATIONS

European Patent Office, International Search Report, Application No. PCT/FI2023/050018, mailed Mar. 31, 2023, 3 pages.
(Continued)

*Primary Examiner* — Cindy Trandai
(74) *Attorney, Agent, or Firm* — Ziegler IP Law Group, LLC.

(57) ABSTRACT

A method of controlling a pairing-based short-range connection between a detector-defined space and a communication device, including detecting an act of at least one person leaving the detector-defined space, and forgetting pairing between the detector-defined space and said communication device in a communication unit of the detector-defined space, in response to said detecting, to prevent future automatic reconnection with said communication device.

20 Claims, 3 Drawing Sheets

(58) Field of Classification Search
CPC ... H04W 76/23; H04L 63/107; H04M 1/6066; H04M 2250/02
See application file for complete search history.

(56) References Cited

U.S. PATENT DOCUMENTS

| | | | |
|---|---|---|---|
| 2009/0076920 A1* | 3/2009 | Feldman | G07F 17/40 707/E17.014 |
| 2012/0003933 A1 | 1/2012 | Baker et al. | |
| 2012/0217882 A1* | 8/2012 | Wong | H05B 47/115 315/312 |
| 2012/0322376 A1 | 12/2012 | Couse | |
| 2015/0170504 A1* | 6/2015 | Jooste | A61B 5/6802 340/539.12 |
| 2018/0019995 A1* | 1/2018 | Morita | H04L 63/0861 |
| 2019/0147426 A1 | 5/2019 | Kieffer et al. | |
| 2019/0228348 A1 | 7/2019 | O'keefe-Sally et al. | |
| 2019/0320054 A1 | 10/2019 | Thorington | |
| 2020/0059787 A1 | 2/2020 | Whitaker et al. | |
| 2020/0143613 A1* | 5/2020 | Carter | G07C 9/30 |
| 2020/0382569 A1* | 12/2020 | Fornshell | H04M 1/6066 |
| 2021/0383627 A1 | 12/2021 | Saito et al. | |
| 2021/0392464 A1 | 12/2021 | Lee et al. | |
| 2023/0162533 A1* | 5/2023 | Matsuzawa | G06Q 20/40145 382/115 |
| 2024/0381463 A1* | 11/2024 | Nakahira | H04W 48/08 |

OTHER PUBLICATIONS

European Patent Office, Written Opinion of the International Searching Authority, Application No. PCT/FI2023/050018, mailed Mar. 31, 2023, 9 pages.

Finnish Patent and Trademark Office, Office Action, U.S. Appl. No. 20/225,031, mailed Aug. 30, 2022, 9 pages.

* cited by examiner

CONTROLLING COMMUNICATION OF A DETECTOR-DEFINED SPACE

FIELD

The present disclosure generally relates to the control of communications of a detector-defined space, such as an office pod.

BACKGROUND

This section illustrates useful background information without admission of any technique described herein representative of the state of the art.

Office pods, such as soundproof conference or phone booths, are increasingly used in modern furnishing of workplaces as well as public spaces. Such pods are often used for working, telephone calls and video conferencing.

Bluetooth is a generally used technology for short-range connectivity on mobile devices. It is known to use Bluetooth e.g. for music streaming to a local speaker. Bluetooth typically broadcasts a beacon signal. This signal is detected by another Bluetooth-enabled device and a pairing-based connection is established based on this. When the connection is first time established, the user needs to approve the connection, however next times a connection between the devices is automatically established due to storing required information (pairing information) in the memories of the devices.

Using a pairing-based connection to connect with an office pod, however, has certain challenges.

SUMMARY

It has been observed that using Bluetooth (or a similar protocol supporting pairing-based connection establishment) as a connection protocol for mobile device connectivity with office pods may end up in difficulties in ensuring that only the person using the pod has his/her mobile device connected, and only if they so choose. For example, when a person has a flow-state work moment in an office pod and a user who has used the pod in the past with Bluetooth connectivity walks by talking into his/her mobile phone, the phone may connect to the pod's Bluetooth unit automatically. And, in case the pod has a speaker system, the call may be automatically transferred to the pod speaker system, thereby interrupting the workflow of the current pod user.

It is an object of certain embodiments of the invention to cope with this identified problem or at least to provide an alternative to existing solutions.

According to a first example aspect of the invention there is provided a method of controlling a pairing-based short-range connection between a detector-defined space and a communication device, comprising:
  detecting an act of at least one person leaving the detector-defined space; and
  forgetting pairing between the detector-defined space and said communication device in a communication unit of the detector-defined space, in response to said detecting, to prevent future automatic reconnection with said communication device.

In certain embodiments, said forgetting pairing comprises deleting (or removing) pairing information in the communication unit.

In certain embodiments, said forgetting pairing comprises deleting (or removing) pairing information (including a secret key shared by the detector-defined space and said communication device) from an applicable memory of the detector-defined space, such as from a memory of the communication unit of the detector-defined space.

In certain embodiments, the pairing-based short-range connection is a connection requiring an authentication key (or master key) and an encryption key (or session key), wherein when a new connection is established the session key is automatically created based on the authentication key if the authentication key exists.

In certain embodiments, said forgetting pairing comprises deleting an authentication key (or a respective authentication key) in the communication unit.

The detector-defined space herein means any space whose occupation by a person or people can be detected by a detector. Examples of detector-defined spaces are office pods, such as conference or phone booths (which may also be soundproof), open-space extensions of said office pods, working places at different hallways, meeting rooms, seats or compartments at different vehicles, etc. The detectors applied to detect the presence and presence changes in said detector-defined spaces comprise infrared (IR) detectors, optical imaging-based detectors, ultrasound detectors, pressure sensors, door sensors, etc.

By the pairing-based short-range connection herein is meant a wireless connection established by a specific one-time pairing procedure which results in bonding two devices together so that they possess a special affinity, secured by the shared secret key allowing them to automatically reconnect (without user interaction) whenever they are within range in the future.

In certain embodiments, the pairing procedure requires an authentication process where a user must validate the connection between devices.

In certain embodiments, the method comprises:
  establishing the pairing-based short-range connection between the detector-defined space and the communication device triggered by (or upon) an overt action of at least one person within (or at) the detector-defined space.

In certain embodiments, said overt action occurs at a connection establishment area.

Accordingly, in certain embodiments, said overt action is implemented by a short-range communication method, such as an NFC, RFID, UWB, or QR code method, or simply by pushing a button or touching a sensor.
  NFC=Near Field Communication
  RFID=Radio frequency identification
  UWB=Ultra wideband
  QR code=Quick response code In certain embodiments, the method comprises:
  preventing connection establishment between the detector-defined space and other communication devices while an established connection exists.

In practice, said preventing can be implemented by taking care that no other device than the one that currently holds an established connection with the detector-defined space has its pairing information stored at the detector-defined space (or at the communication unit of the detector-defined space). In this way no device can automatically reconnect with the detector-defined space.

In certain embodiments, the method comprises:
  establishing a new pairing-based short-range connection between the detector-defined space and a new communication device triggered by (or upon) a further overt action of at least one person within (or at) the detector-defined space (at the connection establishment area). In that case, an old connection is forgotten before a new connection is established. In that way in an office pod having a plurality of simultaneous users, the device connecting with the pod can be changed on the fly.

In certain embodiments, said detecting an act of at least one person leaving the detector-defined space comprises both detecting a change in presence information of the detector-defined space and detecting a change in an existing connection between the detector-defined space and the communication device.

In certain embodiments, said detecting a change in an existing connection comprises detecting the connection being dropped or detecting a degradation in a signal level. The connection being dropped may be detected due to the user actively dropping the connection, or for example, the connection being dropped due to moving the communication device of out range.

In certain embodiments, the method comprises:
forgetting pairing in response to detecting that the connection between the detector-defined space and the communication device has been idle for a predetermined period of time. For example, the user may have exited the detector-defined space and continued working at her/his desk and therefore does not need the speakers/display of the detector-defined space anymore.

In certain embodiments, the detector-defined space specifically is a soundproof booth, or a confined space adjacent to a soundproof booth.

In certain embodiments, said short-range connection specifically is a Bluetooth connection. In other embodiments, said short-range connection is a Wi-Fi based connection, such as a Wi-Fi Direct connection.

According to a second example aspect of the invention there is provided a detector-defined space, comprising:
a communication unit configured to control a pairing-based short-range connection between the detector-defined space and a communication device;
a detector configured to detect an act of at least one person leaving the detector-defined space, wherein the communication unit is configured to forget pairing between the detector-defined space and said communication device, in response to said detecting, to prevent future automatic reconnection with said communication device.

In certain embodiments, said forgetting pairing comprises deleting (or removing) pairing information (of the particular short-range connection in question, i.e. respective pairing information) in the communication unit.

In certain embodiments, said forgetting pairing comprises deleting an authentication key in the communication unit.

In certain embodiments, the detector-defined space comprises:
the communication unit configured to establish the pairing-based short-range connection between the detector-defined space and the communication device triggered by an overt action of at least one person within the detector-defined space.

In certain embodiments, said overt action is implemented by a short-range communication method, such as an NFC, RFID, UWB, or QR code method.

In certain embodiments, the detector-defined space comprises:
the communication unit configured to prevent connection establishment between the detector-defined space and other communication devices while an established connection exists.

In certain embodiments, the detector-defined space comprises:
the communication unit configured to establish a new pairing-based short-range connection between the detector-defined space and a new communication device triggered by a further overt action of at least one person within the detector-defined space.

In certain embodiments, said detecting an act of at least one person leaving the detector-defined space comprises both detecting a change in presence information of the detector-defined space and detecting a change in an existing connection between the detector-defined space and the communication device.

In certain embodiments, said detecting a change in an existing connection comprises detecting the connection being dropped or detecting a degradation in a signal level.

In certain embodiments, the detector-defined space comprises:
the communication unit configured to forget pairing in response to detecting that the connection between the detector-defined space and the communication device has been idle for a predetermined period of time.

According to a third example aspect of the invention there is provided an apparatus, comprising:
at least one processor; and
at least one memory including computer program code, the at least one memory and the computer program code being configured, with the at least one processor, to cause the apparatus to perform the method of the first aspect or any of its embodiments.

According to a fourth example aspect of the invention there is provided a computer program product comprising a non-transitory computer readable medium having the computer program of the third example aspect stored thereon.

According to a fifth example aspect there is provided an apparatus comprising means for performing the method of the first aspect or any related embodiment.

Any foregoing memory medium may comprise a digital data storage such as a data disc or diskette, optical storage, magnetic storage, holographic storage, opto-magnetic storage, phase-change memory, resistive random access memory, magnetic random access memory, solid-electrolyte memory, ferroelectric random access memory, organic memory or polymer memory. The memory medium may be formed into a device without other substantial functions than storing memory or it may be formed as part of a device with other functions, including but not limited to a memory of a computer, a chip set, and a sub assembly of an electronic device.

Different non-binding example aspects and embodiments have been illustrated in the foregoing. The embodiments in the foregoing are used merely to explain selected aspects or steps that may be utilized in different implementations. Some embodiments and features may be presented only with reference to certain example aspects. It should be appreciated that corresponding embodiments and features apply to other example aspects as well. In particular, the embodiments and features described in the context of the first aspect are applicable to each further aspect, and vice versa. Any appropriate combinations of the embodiments may be formed. Any apparatus and/or methods in the description and/or figures not covered by the claims are examples useful for understanding the invention.

BRIEF DESCRIPTION OF THE FIGURES

Some example embodiments will be described with reference to the accompanying figures, in which.

DETAILED DESCRIPTION

Figure 1:
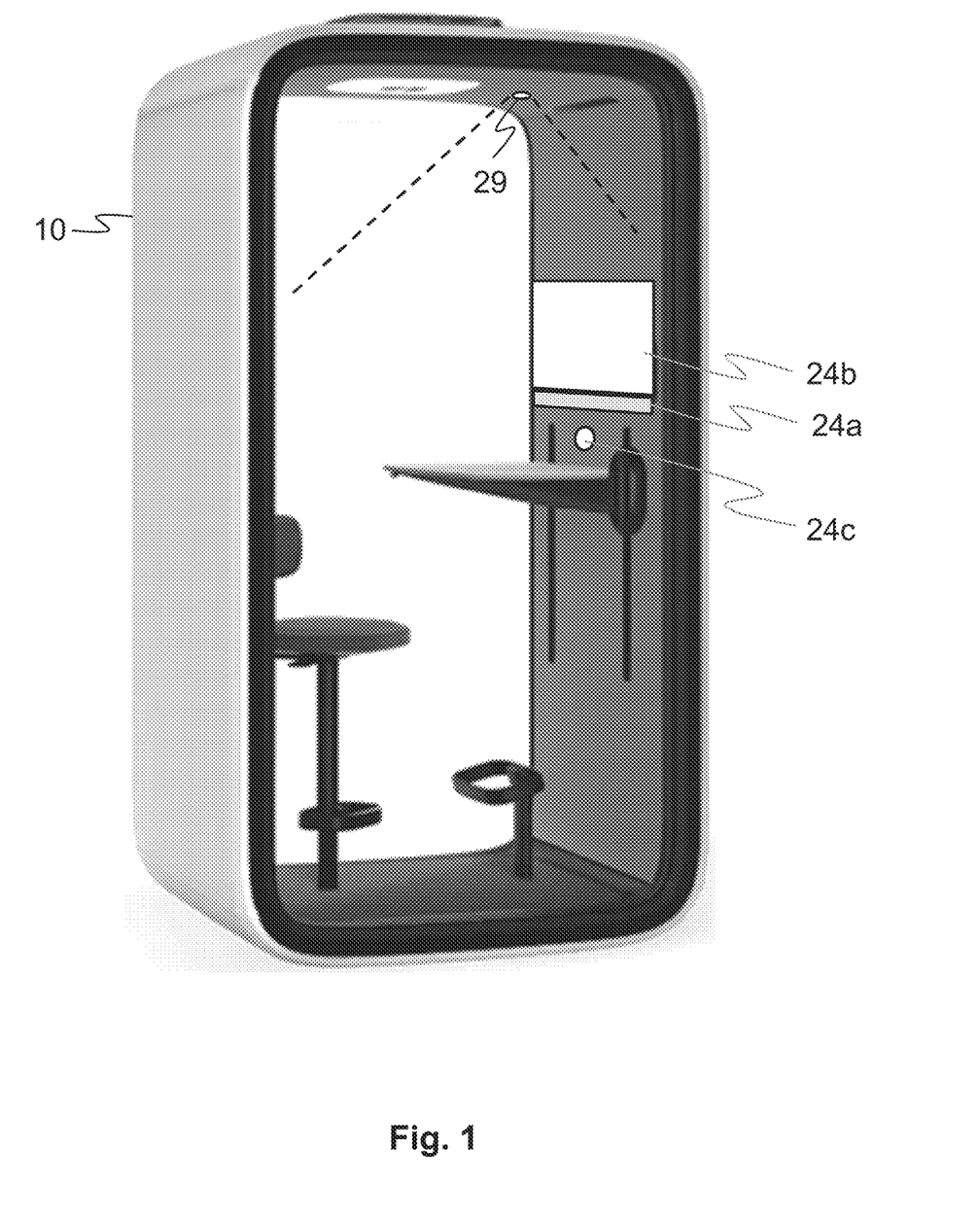
FIG. 1 shows an office pod in accordance with certain embodiments.

In the following description, like reference signs denote like elements or steps. Reference is made to the FIGS. 1-4 with the following numerals and denotations:
10 Office pod
10' Alternative detector-defined space
20 Communication unit
21 Processor
22 Memory
23 Work memory
24 User interface
24a Speaker system
24b Display
24c Connection establishment area
25 Communication interface
26 Non-volatile memory
27 Program code
28 Data
29 Detector
31 Mobile phone
32 Laptop computer
41 Desk
42 Chair
201-203 Method steps FIG. 1 shows a detector-defined space 10 in accordance with certain embodiments. As an example, the detector-defined space 10 is an office pod that encloses a soundproof space for working, telephone calls and video conferencing. The office pod 10 provides Bluetooth connectivity for communication devices that users carry in into the pod. A user can e.g. use an audio system (including one or more speakers and/or one or more microphones) 24a of the pod 10 with his/her communication device once connected with the pod by Bluetooth. Further, the pod 10 may contain a display 24b for the use of the user. In certain embodiments, the display 24b is considered to comprise at least one of the following displays: a display for the user to interact with the pod 10 systems, and a display for the use of the user's communication device. These displays may be incorporated into the one and the same display or they may be implemented as separate displays.

Bluetooth uses pairing-based short-range radio frequency connections. Accordingly, in certain embodiments, once the user is inside the pod 10 the user is enabled to establish a pairing-based connection between his/her communication device and the pod 10 (as an example the user's communication device may be a mobile communication device such as a smart phone, a tablet, or a laptop computer). For this purpose, the pod 10 comprises (or pod 10 systems comprise) a detector 29, for example an infrared detector, shown in FIG. 1, detecting that the pod 10 is occupied by the user. Further, the pod 10 is configured so that the pairing-based connection is established only if the user approves the connection. For example, the pod 10 comprises a connection establishment area 24c, and the user triggers the establishment of the connection by interacting with the connection establishment area 24c. Depending on the implementation the user may push a button at the connection establishment area 24c, or the user may trigger the connection establishment e.g. through using an NFC function. As an example, the connection establishment area 24c comprises an NFC label comprising an address of a Bluetooth enabled communication unit of the pod 10 for the user's device to scan. Herein it should be noted that alternatively, instead of the connection establishment requiring an overt action through the connection establishment area 24c, any applicable conventional connection establishment procedure can be provided for the user to establish the pairing-based connection.

Once the pairing-based connection has been established between the pod 10 and the communication device the user can use the various systems provided by the pod 10 until the user leaves the pod 10.

When the pod 10 detects the act of the user leaving the pod 10, the pod 10 removes the pairing information it has stored during connection establishment. In this way, when the same user device again appears within the Bluetooth range of the pod 10, no automatic and unintentional reconnecting of the pairing-based connection occurs, but if the user desires to use the pod systems anew this requires a similar connection establishment procedure as previously (including pairing-based connection establishment and user approval of the connection within or at the pod).

Figure 2:
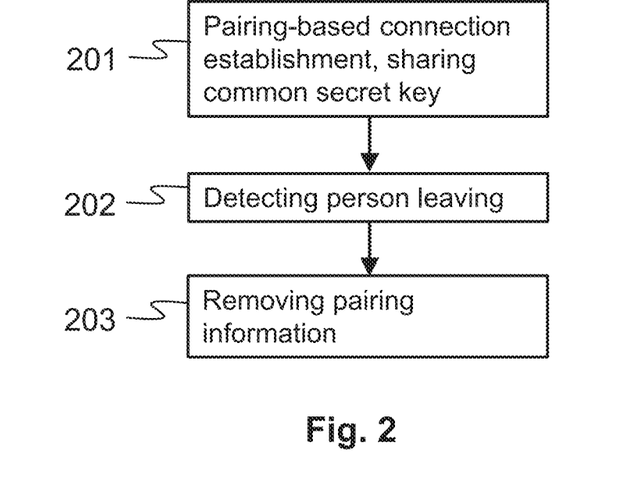
FIG. 2 shows a flow chart of a method in accordance with certain embodiments.

FIG. 2 shows a flow chart of a method in accordance with certain embodiments. In step 201, a pairing-based connection is established between the pod (or, generally speaking, a detector-defined space) 10 and a communication device of a user that is entering or has entered the pod.

In step 202, the pod 10 detects a person leaving, and in step 203, stored pairing information is removed in response to said detecting to prevent future automatic reconnection with said communication device.

Each of the steps 201-203 are explained further in the following in the context of an example embodiment.

Connection Establishment

As mentioned, the pod 10 provides pairing-based short-range connections for users. The connection establishment of a pairing-based connection comprises a specific one-time pairing procedure which results in bonding two devices together so that they possess a special affinity, secured by a shared secret key which would normally allow them to automatically reconnect (without user interaction) whenever they are within range in the future. However, in the presented embodiment, it is specifically not intended that automatic reconnection will occur. Therefore, the pairing information stored during the pairing-procedure is removed from the pod memory once it is detected that the user leaves the pod.

In certain embodiments (such as in Bluetooth examples), the pairing-based short-range connection is a connection requiring an authentication key (or master key) and an encryption key (or session key), wherein when a new connection is established the session key is automatically created based on the authentication key if the authentication key exists. In these embodiments, the removal of the stored pairing information specifically includes deleting the authentication.

The pairing procedure in certain embodiments requires an authentication process where a user must validate (or accept) the connection between devices (with an overt action). In an embodiment, once the detector 29 detects that the user enters the pod 10, the pod opens a Bluetooth menu on a pod user interface providing options for the user to choose. Once the user chooses connection set up, the user interface in an embodiment displays a QR code which has the details for Bluetooth connectivity for the particular pod. The user scans the QR code with his/her mobile device (communication device) camera, the pairing is completed by storing a common secret key into the pod and mobile device memories, and a connection is established between the pod (or its communication unit) and the mobile device of the user.

As an alternative to the example QR code method to validate the pairing-based connection establishment, the user uses an NFC function by reaching his/her mobile device into a close proximity of the connection establishment area 24*c* (FIG. 1) which in an embodiment is an area arranged into the pod's inner wall (in other embodiments the connection establishment area 24*c* may be positioned at a work surface of the pod 10 or at a separate stand, etc.). The user's device obtains the address (such as a MAC address) of the Bluetooth enabled communication unit of the pod 10 from an NFC label at the establishment area 24*c*. The user then selects "connect" at his/her communication device, and the connection is established. A corresponding method that does not require opening a menu at the pod end may be implemented by using a QR code.

Yet, alternatively a further a short-range communication method may be employed, such as an RFID method, or simply pushing an appropriate button or touching a sensor inside of the pod 10.

Detecting the Act of a Person Leaving the Pod

In an embodiment, the pod 10 starts monitoring the use of the pod as a separate function once the connection is established. This means that the presence detection may be used to turn on the lights and/or fans in the pod is used in addition to control the Bluetooth connectivity of the pod 10. The connection is kept on as long as the user is in the pod 10. Once the user leaves the pod 10, the presence detection detects that the user has left the pod 10. In practice, this can be implemented for example by detecting with the detector 29 that no one is present inside the pod 10. Alternatively, other sensing arrangements to provided presence information can be used depending on the embodiment.

In further embodiments, the detecting of the act of a person leaving the pod comprises both detecting a change in presence information of pod 10 and detecting a change in the ongoing connection between the pod 10 and the mobile device. For example, it may be detected that the connection has been dropped or that the signal level of the connection has been reduced below a predetermined limit. The connection being dropped may be detected due to the user actively dropping the connection, or for example, the connection being dropped due to moving the mobile device of out the Bluetooth range of the pod 10. Based on the detected change in presence information (e.g., at least one person leaving the pod) and based on the detected change in the connection, it is concluded in certain embodiments that both the user and his/her mobile device have left the pod 10.

In further embodiments, there may be arranged a delay in a "raw" non-presence detection and an "inferred" non-presence detection. For example, if presence sensor raw data of the detector 29 indicates "no presence" for a pre-determined period of time (e.g. 20 consecutive seconds), only then the inferred detection is set to "no presence". In this way e.g. occasional false "no presence" sensor readings can be omitted. Also such a delay can allow e.g. quickly fetching something from the outside of the pod without the connection being terminated and forgotten.

Removing Pairing Information

During the pairing-based connection establishment, pairing information enabling the mobile device and the pod to automatically reconnect has been stored in the memory of the pod 10 and in the memory of the mobile device. The pairing information at least comprises the shared secret key that is specific to the formed device pair. The pairing information may further comprise identification information, such as device addresses.

Now that the act of a person (and his/her mobile device) leaving the pod 10 was detected in step 202, the Bluetooth connectivity between the pod's communication unit and the mobile device of the user is disconnected and the pairing information (including the secret key) is forgotten by the communication unit (removed from its memory). This means that the user will have to pair his/her mobile device again when using the pod 10 next time.

By removing the pairing information situations where the user would get a "pop-up screen" on his/her mobile device to ask if a connection is made between the pod 10 and the mobile device is avoided. Assuming there are multiple pods in the office and the user has previously used several of them with pairing, this reconnection topic would be very annoying when not inside the pod.

With larger pods there can be several occupants inside the pod. The pairing-based connection can be established in similar manner than with single person pods. To ensure a more accurate conclusion about a right person (i.e. the person having his/her mobile device connected with the pod) leaving the pod the foregoing determination taking into account both a presence change and a change in the connection established with the pod can be taken into account. If for example the mobile device goes out of range and a change in presence information (i.e. at least one person leaving the pod) is detected it may be concluded that the stored pairing information is to be forgotten at the pod's end.

As an alternative in larger pods and/or other multi-user detector-defined spaces, the detector may be configured to track individual persons in a group of multiple persons within the pod (space), for example with optical imaging comprising a machine vision algorithm configured to individuate and track persons in a group. In this manner the person initiating the pairing may be detected to leave the pod (space) which, in turn, may be employed as a trigger event for terminating the connection and removing the pairing information.

In further embodiments, pairing information is removed in response to detecting that the connection between the pod and the mobile device has been idle for a predetermined period of time. For example, the user may have exited the pod and continued working at her/his desk and therefore does not need the speakers/display of the pod anymore.

Yet in further use scenarios, if there remains presence within the pod but the signal strength of the ongoing connection weakens, the connection is disconnected and the respective pairing forgotten. And, vice versa, if the signal strength remains the same and presence information changes (but does not go to zero), someone is still inside and the mobile device is still inside so the connection must not be disconnected.

Figure 3:
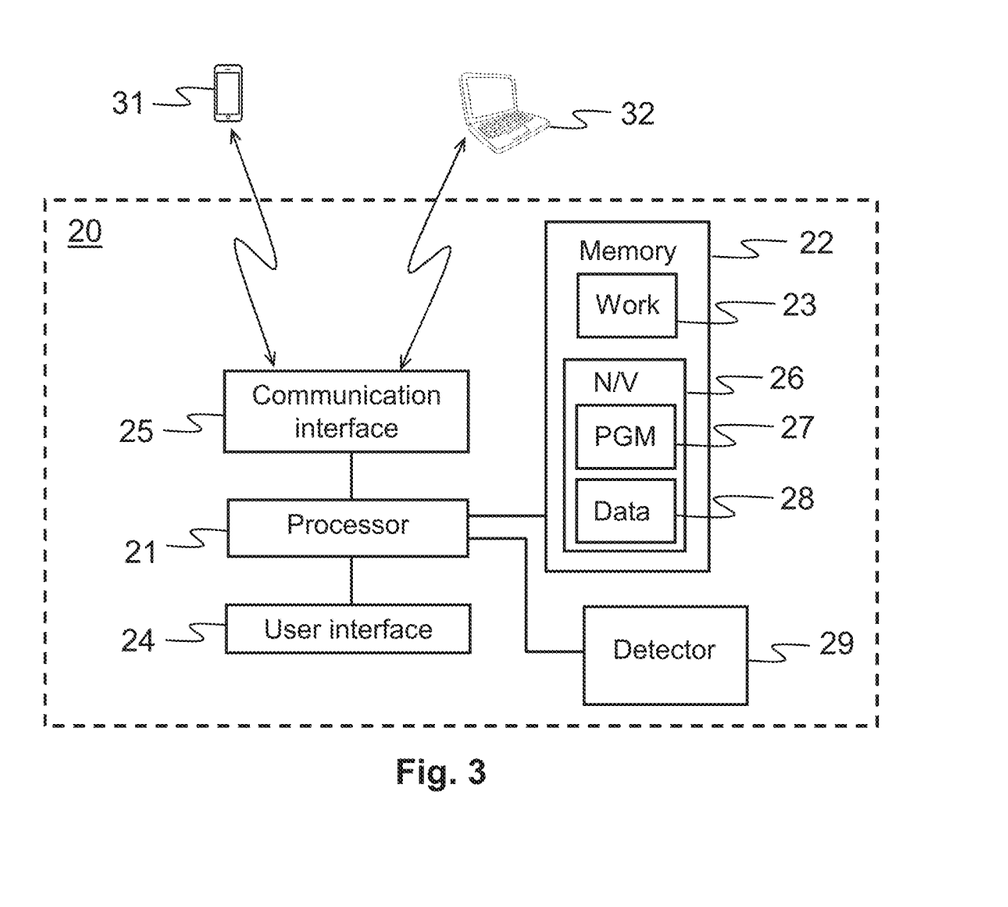
FIG. 3 shows a schematic block diagram of the office pod of FIG. 1 in accordance with certain embodiments.

FIG. 3 shows a block diagram of an apparatus 20 according to an embodiment. The apparatus 20 is for example a general-purpose computer or server or some other electronic data processing apparatus. In a specific embodiment, the apparatus implements a communication unit of a detector-defined space, such as the office pod 10. Accordingly, the apparatus 20 can be used for implementing at least some embodiments of the invention. In certain embodiments, the apparatus 20 is implemented within a wall structure of the office pod 10. Alternatively, the apparatus 20 is implemented in or at least partly integrated into a control panel of the pod 10 (which control panel also controls other functions of the pod such as lights and ventilation).

The apparatus 20 comprises a communication interface 25, a processor 21, a user interface 24, and a memory 22.

The communication interface 25 comprises in an embodiment a wired and/or wireless communication circuitry, such as Ethernet, Wireless LAN, GSM, CDMA, WCDMA, LTE, and/or 5G circuitry. In a specific embodiment, the communication interface 25 comprises Bluetooth circuitry thereby providing the apparatus 20 with Bluetooth connectivity to connect with Bluetooth enabled mobile devices (communication devices) of the users of the detector-defined space such as a smart phone 31 or a laptop computer 32.

The communication interface can be integrated in the apparatus 20 or provided as a part of an adapter, card or the like, that is attachable to the apparatus 20. The communication interface 25 may support one or more different communication technologies. The apparatus 20 may also or alternatively comprise more than one communication interface 25.

Alternatively, in certain embodiments instead of or in addition to Bluetooth the communication interface 25 comprises Wi-Fi based circuitry to provide the apparatus 20 with Wi-Fi based (such as Wi-Fi Direct) connectivity to connect with Wi-Fi (or Wi-Fi Direct) enabled mobile devices (communication devices) of the users.

The processor 21 may be a central processing unit (CPU), a microprocessor, a digital signal processor (DSP), a graphics processing unit, an application specific integrated circuit (ASIC), a field programmable gate array, a microcontroller or a combination of such elements.

The user interface 24 may comprise a circuitry for receiving input from a user of the apparatus 20, e.g., via a keyboard, graphical user interface shown on the display of the apparatus 20, speech recognition circuitry, microphone, or an accessory device, such as a headset, and for providing output to the user via, e.g., a graphical user interface or a loudspeaker. The user interface 24 in certain embodiments implements the speaker 24*a*, the display 24*b* and the sensing means or connection establishment area 24*c*.

The memory 22 comprises a work memory 23 and a persistent (non-volatile, NN) memory 26 configured to store computer program code 27 and data 28. The memory 26 may comprise any one or more of: a read-only memory (ROM), a programmable read-only memory (PROM), an erasable programmable read-only memory (EPROM), a random-access memory (RAM), a flash memory, a data disk, an optical storage, a magnetic storage, a smart card, a solid state drive (SSD), or the like.

The apparatus 20 may comprise a plurality of memories 26. The memory 26 may be constructed as a part of the apparatus 20 or as an attachment to be inserted into a slot, port, or the like of the apparatus 20 by a user or by another person or by a robot. The memory 26 may serve the sole purpose of storing data, or be constructed as a part of an apparatus 20 serving other purposes, such as processing data.

The apparatus further comprises the detector 29 that provides the apparatus with said presence information of the presence of users within the detector-defined space. The detector 29 may be implemented as embedded within the apparatus 20 or as a separate unit comprised by the apparatus 20. The detector 29 in certain embodiments comprises different sensors, such as IR-sensor(s), door sensor, etc.

As to the storing said pairing information, the processor 21 in certain embodiments as instructed by the program code 27 stores the pairing information within the data section 28 of the memory 26. Further, as to said removal of said pairing information, the processor 21 in certain embodiments as instructed by the program code 27 deletes the pairing information from the memory 26.

A skilled person appreciates that in addition to the elements shown in FIG. 3, the apparatus 20 may comprise other elements, such as further microphones, displays, as well as additional circuitry such as an input/output (I/O) circuitry, memory chips, application-specific integrated circuits (ASIC), a processing circuitry for specific purposes such as a source coding/decoding circuitry, a channel coding/decoding circuitry, a ciphering/deciphering circuitry, and the like. Additionally, the apparatus 20 may comprise a disposable or rechargeable battery (not shown) for powering the apparatus 20 when an external power supply is not available.

Figure 4:
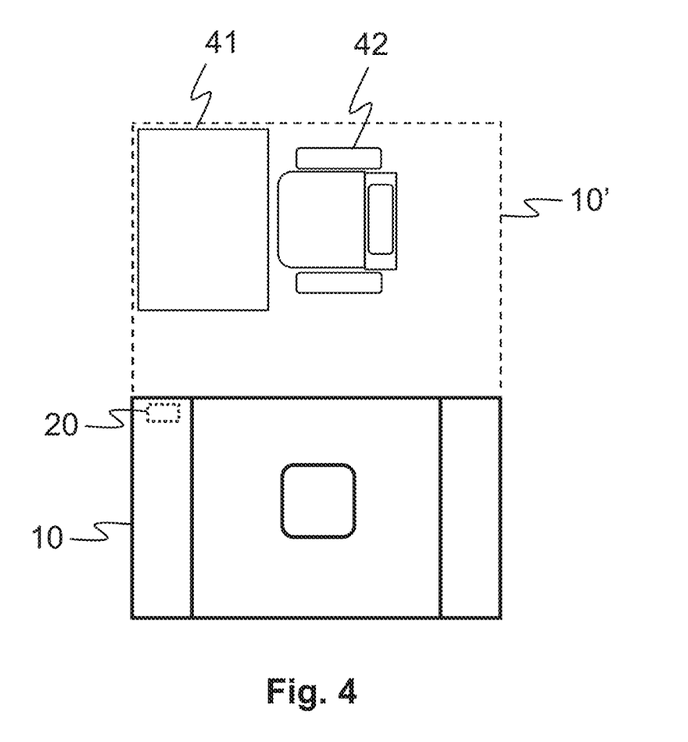
FIG. 4 shows an alternative scenario in accordance with certain embodiments.

FIG. 4 shows an alternative embodiment comprising a confined space 10' adjacent to an office pod 10. The confined space 10' is a detector-defined space similarly as the space 10. Unlike the office pod 10 that may be a soundproof space, the confined space 10' is not soundproof. However, it may provide a working area equipped with a desk 41 and a chair 42 and utilizing short-range radio frequency (Bluetooth, or similar) connectivity provided by a communication unit 20 attached to a wall of the pod 10 similarly as was described in the foregoing with respect to the space 10. Alternatively, the communication unit 20 may be implemented as not being attached to the pod 10, for example, as a separate device or apparatus, or as a device or apparatus integrated into the desk 41 or the chair 42.

Similarly, detector-defined spaces can be provided at different fixed meeting rooms, or at open hallways or even at compartments or seats of vehicles. In the last alternative, the detector providing presence information may be a pressure detector attached to car, bus or an airplane seat, for example. The pairing-based connection establishment and removal of pairing information in response to detecting the act of the person leaving the detector-defined space is performed similarly as in the embodiments described in more detail in the foregoing.

Without limiting the scope and interpretation of the patent claims, certain technical effects of one or more of the example embodiments disclosed herein are listed in the following. A technical effect is to ensure that only the person using a detector-defined space has his/her mobile device connected. Automatic reconnection without the user being inside the detector-defined space is prevented. Further, automatic reconnection without an overt action by the user is prevented. Accordingly, a technical effect is also to improve security aspects of detector-defined spaces due to forgetting the pairing at the end of the detector-defined space. User device information does not remain stored in pods that are placed in public areas. The risk of user device information being abused is thereby reduced.

Various embodiments have been presented. It should be appreciated that in this document, words "comprise", "include", and "contain" are each used as open-ended expressions with no intended exclusivity.

The foregoing description has provided by way of non-limiting examples of particular implementations and embodiments a full and informative description of the best mode presently contemplated by the inventors for carrying out the invention. It is however clear to a person skilled in the art that the invention is not restricted to details of the embodiments presented in the foregoing, but that it can be implemented in other embodiments using equivalent means or in different combinations of embodiments without deviating from the characteristics of the invention.

Furthermore, some of the features of the afore-disclosed example embodiments may be used to advantage without the corresponding use of other features. As such, the foregoing description shall be considered as merely illustrative of the principles of the present invention, and not in limitation thereof. Hence, the scope of the invention is only restricted by the appended patent claims.

The invention claimed is:

1. A method of controlling a pairing-based short-range connection between a communication device of a user and a communication unit of a physical working space, wherein the physical working space comprises a presence detector configured to track the presence of the user in the physical working space, the method comprising:
   receiving data from the presence detector indicating that the user has left the physical working space; and,
   as a response to receiving the data, forgetting pairing between the communication unit of the physical working space and said communication device of the user to prevent future automatic reconnection with said communication device.

2. The method of claim 1, wherein said forgetting pairing comprises deleting pairing information in the communication unit.

3. The method of claim 2, wherein said forgetting pairing comprises deleting an authentication key in the communication unit.

4. The method of claim 1, comprising:
   establishing the pairing-based short-range connection between the communication unit of the physical working spaced and the communication device of the user triggered by an overt action of the user within the physical working space.

5. The method of claim 4, wherein said overt action is implemented by one of the following short-range communication methods: NFC, RFID, UWB, or QR code method.

6. The method of claim 4, comprising:
   establishing a new pairing-based short-range connection between the communication unit of the physical working space and a new communication device of another user triggered by a further overt action of the another user within the physical working space.

7. The method of claim 1, comprising:
   preventing connection establishment between the communication unit of the physical working space and other communication devices while an established connection exists.

8. The method of claim 1, further comprising detecting a change in an existing connection between the communication unit of the physical working space and the communication device of the user.

9. The method of claim 8, wherein said change in an existing connection relates to the connection being dropped or to a degradation in a signal level.

10. The method of claim 1, comprising:
    forgetting pairing in response to detecting that the connection between the communication unit of the physical working space and the communication device has been idle for a predetermined period of time.

11. The method of claim 1, wherein the physical working space is a soundproof booth, or a confined space adjacent to a soundproof booth.

12. The method of claim 1, wherein said short-range connection is a Bluetooth connection.

13. A physical working space, comprising:
    a communication unit configured to control a pairing-based short-range connection between the communication unit of the physical working space and a communication device of a user;
    a presence detector configured to detect an act of at least one person leaving the physical working space, wherein the communication unit is configured to receive data from the presence detector indicating that the user has left the physical working space, and as a response to receiving the data, forget pairing between the communication unit of the physical working space and said communication device of the user to prevent future automatic reconnection with said communication device.

14. The physical working space of claim 13, wherein the communication unit is configured to delete pairing information in the communication unit in response to said forgetting.

15. The physical working space of claim 13, wherein the communication nit is configured to delete an authentication key in the communication unit in response to said forgetting.

16. The physical working space of claim 13, comprising:
    the communication unit configured to establish the pairing-based short-range connection between the detector-defined space and the communication device triggered by an overt action of at least one person within the detector-defined space.

17. The physical working space of claim 16, comprising:
    the communication unit configured to establish a new pairing-based short-range connection between the communication unit of the physical working space and a new communication device of another user triggered by a further overt action of the another user within the physical working space.

18. The physical working space of claim 13, comprising:
    the communication unit configured to prevent connection establishment between the communication unit of the physical working space and other communication devices while an established connection exists.

19. The physical working space of claim 13, wherein the communication unit is configured to detect a change in an existing connection between the communication unit of the physical working space and the communication device of the user.

20. An apparatus for controlling a pairing-based short-range connection between a communication device of a user and a communication unit of a physical working space, where the physical working space comprises a presence detector configured to track a presence of the user in the physical working space, the apparatus comprising:
    at least one processor; and
    at least one memory including computer program code, the at least one memory and the computer program code being configured, with the at least one processor, to cause the apparatus to
    receive from a detector, data indicating that the user has left the physical working space ; and as a response to the received data
    forget pairing between the communication unit of the detector-defined space and a communication device of the user to prevent future automatic reconnection with said communication device.

* * * * *